US008995586B2

(12) United States Patent
Ly-Gagnon et al.

(10) Patent No.: US 8,995,586 B2
(45) Date of Patent: Mar. 31, 2015

(54) SYSTEM AND METHOD FOR PREDICTING A POSITIVE CORRELATION

(75) Inventors: Yann Ly-Gagnon, San Jose, CA (US); Paul Husted, San Jose, CA (US); Olaf Josef Hirsch, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 703 days.

(21) Appl. No.: 13/216,137

(22) Filed: Aug. 23, 2011

(65) Prior Publication Data

US 2013/0051503 A1 Feb. 28, 2013

(51) Int. Cl.
*H04L 27/06* (2006.01)
*H04W 52/02* (2009.01)

(52) U.S. Cl.
CPC ............ *H04W 52/0229* (2013.01); *Y02B 60/50* (2013.01)
USPC ........................................................ 375/343

(58) Field of Classification Search
USPC ........................................................ 375/343
See application file for complete search history.

(56) References Cited

U.S. PATENT DOCUMENTS

| 6,049,885 | A  | * | 4/2000  | Gibson et al. | ................ | 713/324 |
| 6,829,288 | B2 | * | 12/2004 | Orava         | ........................... | 375/132 |
| 8,599,824 | B2 | * | 12/2013 | Walley et al. | ................ | 370/350 |
| 2007/0049991 | A1 | * | 3/2007  | Klostermann et al. | .......... | 607/60 |
| 2008/0076364 | A1 |   | 3/2008  | Hall          | | |
| 2010/0303185 | A1 |   | 12/2010 | Haartsen      | | |
| 2011/0039512 | A1 |   | 2/2011  | Ferchland et al. | | |

FOREIGN PATENT DOCUMENTS

| EP | 1383247 A1 | 1/2004 |
| WO | 9802973 A1 | 1/1998 |
| WO | 2013028896 | 2/2013 |

OTHER PUBLICATIONS

International Search Report and Written Opinion—PCT/US2012/052116—ISA/EPO—Dec. 7, 2012.
"PCT Application No. PCT/US2012/052116 Written Opinion of the IPEA", Jul. 31, 2013 , 5 pages.
"PCT Application No. PCT/2012/052116 International Preliminary Report on Patentability", Oct. 29, 2013 , 9 pages.

* cited by examiner

*Primary Examiner* — Don N Vo
(74) *Attorney, Agent, or Firm* — DeLizio Gilliam, PLLC

(57) ABSTRACT

A device and method are disclosed for reducing the power consumption of a wireless radio device in establishing a wireless connection by predicting a probability of a positive correlation. The wireless radio device may power up a radio receiver of a connectable device to receive a portion of a sync word from a requesting device, determine a correlation value based on the received portion of the sync word and an expected sync word and if the correlation value is less than a threshold value, power down the radio receiver of the connectable device. Additionally, if the correlation value is greater than a threshold value, the entire sync word may be received from the requesting device and a correlation value may be determined based on the entire sync word and the expected sync word.

22 Claims, 4 Drawing Sheets

SYSTEM AND METHOD FOR PREDICTING A POSITIVE CORRELATION

TECHNICAL FIELD

The present application relates to wireless radio systems, and more particularly to systems and methods to reduce the power consumed by a wireless radio system when establishing a connection between wireless radio devices in the system.

BACKGROUND

Bluetooth is a well known wireless radio protocol that describes how wireless devices can interconnect using a short-range wireless connection. To create a wireless radio network, Bluetooth enabled devices must be connected to one another. To establish a connection, a first Bluetooth enabled device attempting to establish a connection with a second Bluetooth enabled device in the network, repeatedly broadcasts connection request packets including the unique device access code (DAC) of the second Bluetooth enabled device. The second Bluetooth enabled device periodically scans specific radio frequencies within the industrial, scientific and medical (ISM) radio band to listen for any connection request packets for the duration of a scanning window. If the second Bluetooth enabled device receives a connection request packet during the duration of the scanning window, the second Bluetooth enabled device correlates the device access code included in the connection request packet against the unique access code of the second Bluetooth enabled device to determine if there is a positive correlation between the device access code received and the unique device access code of the second Bluetooth enabled device. If a positive correlation exists, a connection can be established between the first Bluetooth enabled device and the second Bluetooth enabled device.

Low power operation of a wireless radio device is desirable in order to prolong battery life. In order to establish connections among Bluetooth enabled devices, one of the devices must periodically operate its radio receiver to open a scanning window to receive connection request packets which may or may not include its unique device access code. Operating the radio receiver to open the scanning window in order to establish a wireless connection may represent a significant portion of the power consumed by a Bluetooth enabled device. As such, it is desirable to reduce the amount of time that the radio of the Bluetooth enabled device is required to be powered on to receive connection request packets and to establish a connection with another Bluetooth enabled device.

Thus, there is a need for a method and apparatus that reduces the power consumed by a wireless radio device in establishing a connection with another wireless radio device.

SUMMARY

The present application describes a system and method to reduce the power consumed by a wireless radio device during the establishment of a connection between two wireless radio devices. For two wireless radio devices to connect, it may be necessary for a positive correlation to exist between a sync word sent from the requesting device and an expected sync word at the connectable device. Power consumption may be reduced by reducing the duration of time required for the radio receiver of the connectable device to be operational by predicting the probability of a positive correlation based on only a portion of the entire sync word.

A method for predicting a probability of a positive correlation includes, powering up a radio receiver of a connectable device to receive a portion of a sync word from a requesting device, determining a correlation value based on the received portion of the sync word and a portion of an expected sync word and if the correlation value is less than a threshold value, powering down the radio receiver of the connectable device. Additionally, if the correlation value is greater than a threshold value, the entire sync word may be received from the requesting device and a correlation value is determined based on the entire sync word and the entire expected sync word.

A circuit for predicting a probability of a positive correlation includes, a window generator for instructing a radio receiver to power up and to receive a portion of a sync word, a correlator coupled to the window generator, the correlator to determine a correlation value based on the received portion of the sync word and a portion of an expected sync word and a comparator coupled to the correlator and to the window generator, the comparator to determine if the correlation value is less than a threshold value and the comparator for instructing the window generator to power down the radio receiver if the correlation value is less than the threshold value. Additionally, if the correlation value is greater than a threshold value, the window generator for instructing the radio receiver to receive an entire sync word and the at least one correlator to determine a correlation value based on the entire received sync word and the entire expected sync word. The correlation may be performed using a plurality of parallel correlators.

DETAILED DESCRIPTION

Figure 1:
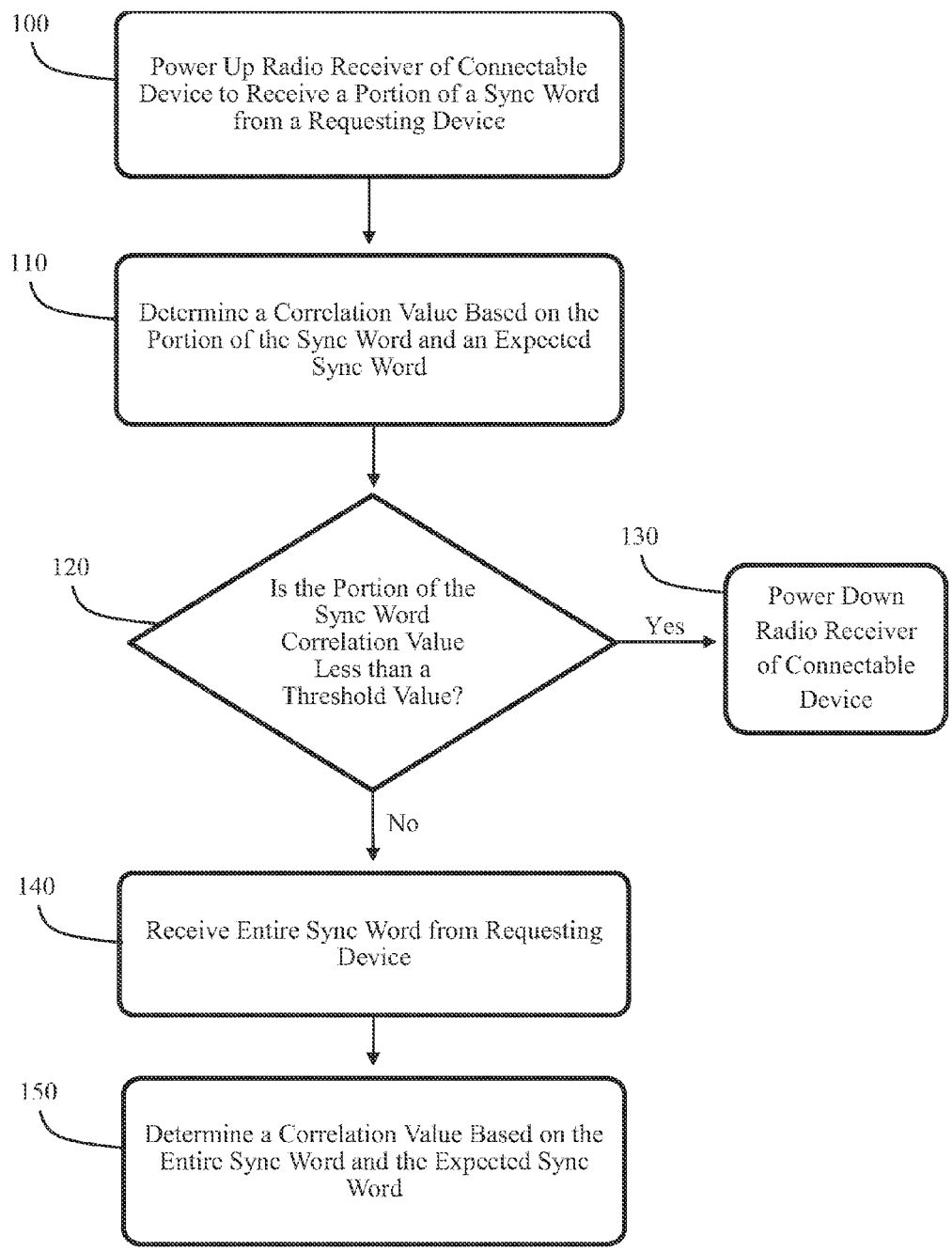
FIG. 1 is a flow diagram illustrating a method for predicting a positive correlation.

Those of ordinary skill in the art will realize that the following detailed description of embodiments in this specification is illustrative only, and is not intended to be in any way limiting. Other embodiments will readily suggest themselves to such skilled persons having the benefit of this disclosure. It will be apparent to one skilled in the art that these specific details may not be required to practice the embodiments. In other instances, well-known devices are shown in block diagram form to avoid obscuring the present application. In the following description of the embodiments, substantially the same parts are denoted by the same reference numerals.

In a Bluetooth system, the procedure for forming connections between Bluetooth enabled devices may be asymmetrical and may require that one Bluetooth enabled device request the connection while the other Bluetooth enabled device is connectable. The connectable Bluetooth enabled device may operate its radio receiver at regular intervals to open a scanning window to listen for connection request packets from the requesting Bluetooth enabled device. The connectable Bluetooth enabled device may consume considerable power during the time the scanning window is open due to the operation of the radio receiver. Power consumption of the connectable Bluetooth enabled device may be reduced by decreasing the amount of time that the radio receiver of the Bluetooth enabled device is operational to establish a connection with another Bluetooth enabled device.

Each connectable Bluetooth enabled device may be identified by a unique device access code. A requesting Bluetooth enabled device may transmit a connection request packet containing a unique device access code of the connectable device to which a connection is desired. The device access code may include at least a preamble and a sync word. To establish a connection between two Bluetooth enabled devices, the sync word from the connection request packet may be correlated against an expected sync word at the receiver of the connectable Bluetooth enabled device. If the result of the correlation exceeds a predetermined threshold, a positive correlation may exist and a connection between the devices can be established.

With reference to FIG. 1, in a wireless radio system, a connectable device may operate its radio receiver to open a scanning window to scan for devices that may be requesting a connection to the connectable device 100. The connectable device may open the scanning window for a duration of time that is less than the time required to receive the entire N bits of the sync word contained within the access code. As such, only a portion (<N) of the sync word may be received. The connectable device may correlate the received portion of the sync word against a portion of the expected sync word to determine a correlation value 110. If the correlation value is less than a threshold value 120, then the connectable device may conclude that a positive correlation does not exist and the connectable device may power off its radio receiver 130.

If the correlation value is greater than a threshold value 120, then the connectable device may conclude that a positive correlation does exist and as such, a requesting device may be requesting a connection. If a positive correlation exists for the portion of the sync word, the connectable device may receive an entire sync word from the requesting device 140 and may correlate the entire sync word received against the entire expected sync word to determine a correlation value for the entire sync word 150. If a positive correlation exists with the entire received sync word, then the connectable device may proceed with establishing a connection with the requesting device.

Reduced power consumption may be achieved by operating the radio receiver of the connectable device for a shorter duration of time to receive only a portion of the sync word and by predicting the probability of a positive correlation for the entire sync word based on the correlation value of a portion of received bits in the sync word.

Figure 2:
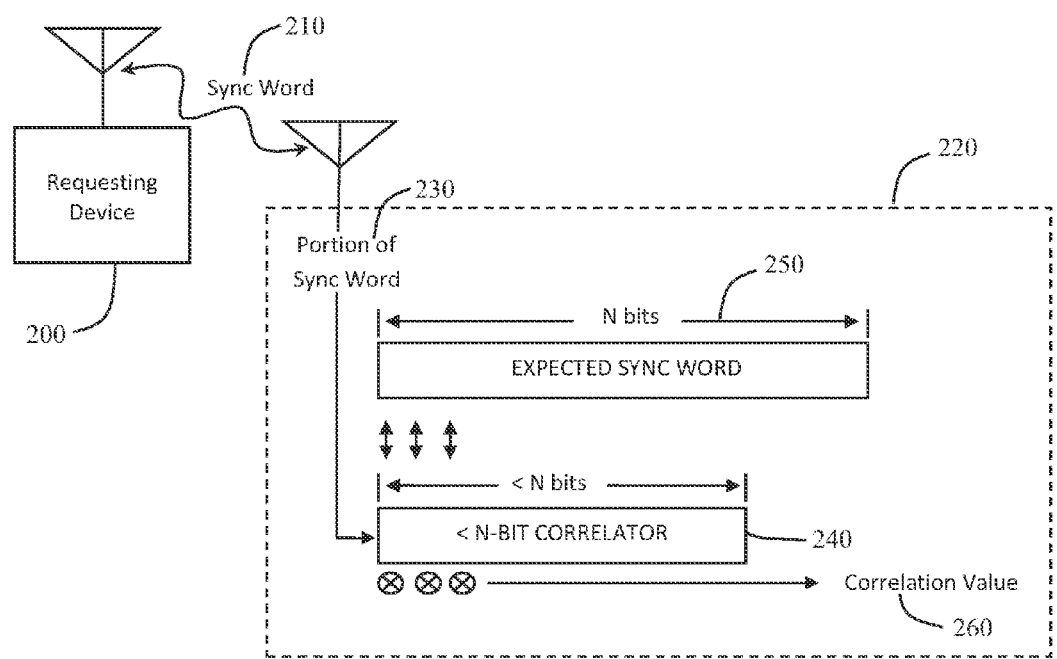
FIG. 2 is a diagram illustrating the correlation of a portion of a sync word.

Referring now to FIG. 2, to reduce power consumption by predicting a positive correlation, the connectable device 220 may receive a portion of a sync word 230 transmitted from a requesting device 200. The received portion of the sync word 230 may comprise fewer bits (<N) than the total number of bits (N) comprising the entire sync word 210 transmitted by the requesting device 200. The connectable device 220 may use a correlator 240 having a size equal to the number of bits (<N) in the received portion of the sync word 230 to determine a correlation value 260 for the received portion of the sync word 230 against a portion of the expected sync word 250. If the correlation value 260 is less than a threshold value, the radio receiver of the connectable device may be powered down. As such, the power consumption of the connectable device may be reduced by operating the radio receiver only long enough to receive a portion of the sync word 230 and to predict whether or not a positive correlation may exist based on the correlation value 260 of the portion of the sync word received 230.

In a particular embodiment, the transmitted sync word in the connection request packet may be a trigger-based 32-bit sync word. In this embodiment, the requesting Bluetooth enabled device may operate its transmitter at given intervals, and for a predetermined of time, to repeatedly transmit the trigger signal which may include the 32-bit sync word on a specific set of frequencies. The connectable Bluetooth enabled device may operate its radio receiver to open a scanning window to listen on the specific set of frequencies for the sync word transmitted by the requesting Bluetooth enabled device. In order to properly align the correlation of the sync word at the receiver, the scanning window may be open long enough to guarantee reception of the first bit of at least one sync word transmitted from the requesting Bluetooth enabled device. Also, additional time may be required for the radio receiver to settle the signal. Assuming a 32-bit sync word and 6 µs of settling time, the scanning window may need to be open for 6µ+32µ+32µ=70 µs to guarantee receipt of the entire 32-bit sync word and to establish proper correlation alignment. To reduce the power consumption of the connectable Bluetooth enabled device, in the present embodiment, the duration of time that the scanning window may remain open is less than the duration of time required for the connectable Bluetooth enabled device to receive the entire 32-bit sync word but long enough to guarantee receipt of the first bit of at least one transmitted sync word. In this embodiment, the scanning window may open for a total of 6µ+25µ+25µ=56 µs. As such, 25 bits of the sync word may be received by the radio receiver of the connectable device.

After 25-bits of the sync word have been received, the connectable device may correlate the 25-bit portion of the sync word against a portion of the expected sync word to determine a correlation value. If the correlation value is less than a predetermined threshold value, then the connectable device may conclude that a positive correlation does not exist and the connectable device may power off the radio receiver.

The connectable device may continue to accumulate bits of the 32-bit sync word during the determination of the correlation value for the 25-bit portion of the sync word. If a positive correlation exists when the correlation is performed using the 25-bit portion of the 32-bit sync word, the connectable device may conclude that a device is requesting a connection and the probability of correlation for the entire 32-bit sync word is high. The connectable device may then correlate the entire 32-bit sync word against the entire expected sync word to determine a correlation value for the entire sync word. If a positive correlation exists with the entire 32-bit sync word, then the connectable device may proceed to establish a connection with the requesting device.

Reducing the duration of the scanning window from 70 µs to 56 µs may represent a power savings of 20%. Reduced power consumption may be achieved by operating the radio receiver of the connectable device for 56 µs to receive 25 bits of the sync word and by predicting the probability of a positive correlation for the entire 32-bit sync word based on the correlation value of 25 bits in the sync word.

Operating the radio receiver of the connectable device to open the scanning window for a total of 56 µs to receive 25 bits of the sync word is exemplary in nature. It is within the scope to vary the number of bits received. Receiving more than 25 bits may reduce the false detect rate for the correlation, but may also increase the power consumption of the connectable device. Receiving less than 25 bits may increase the false detect rate for the correlation, but may further decrease the power consumption of the connectable device.

Figure 3:
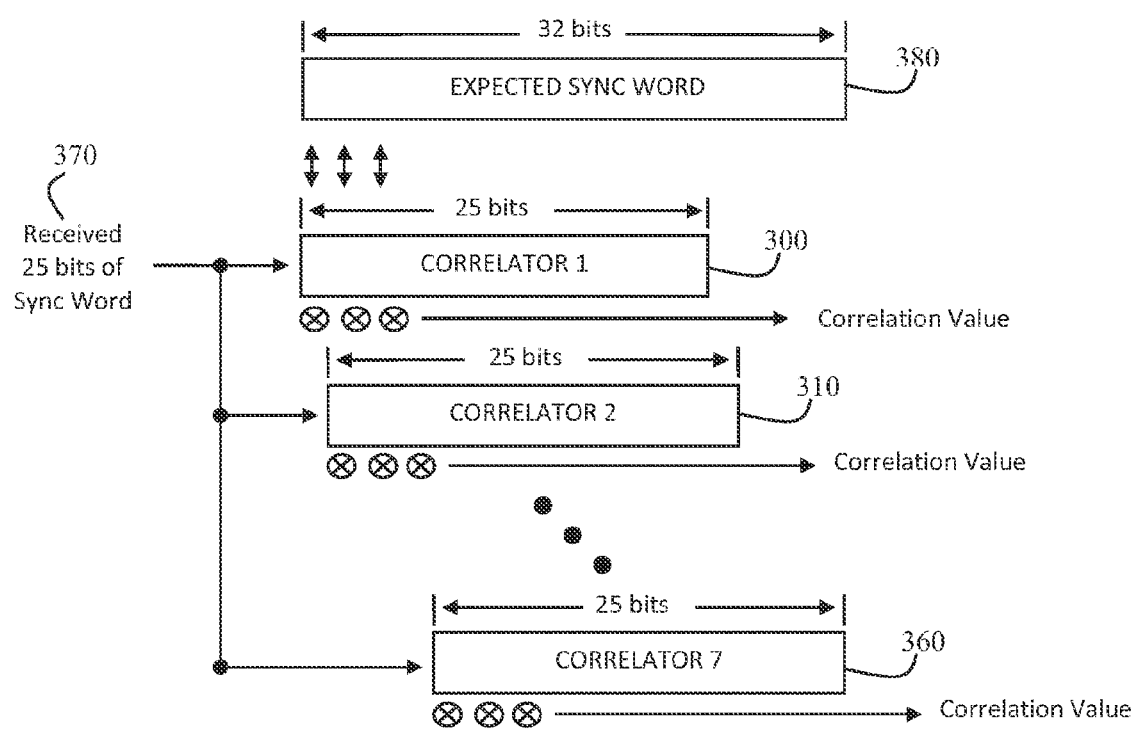
FIG. 3 is a diagram illustrating the correlation of a portion of a sync word using parallel correlators.

In an additional embodiment, parallel correlators may be used to further reduce the power consumption required in establishing a connection by reducing the time required to determine the correlation value. With reference to FIG. 3, assuming a 32-bit sync word, seven correlators 300, 310 . . .

360 can be operated in parallel to correlate the 25-bit portion 370 of the 32-bit sync word against the expected 32-bit sync word 380. Each of the seven correlators 300, 310 . . . 360 has a size equal to the number of bits in the received portion of the sync word, which is 25 bits in this case. Operating seven parallel correlators 300, 310 . . . 360 further reduces the time required to determine the correlation value for the 25-bit portion of the sync word 370.

In another embodiment, thirty-two parallel correlators may be used to determine the correlation value for the 25-bit portion of the sync word. In this embodiment, thirty-two, 25-bit correlators may be operated in parallel to simultaneously correlate against all the possible offsets between the 25-bit portion of the sync word and the portion of the expected sync word. When thirty-two parallel correlators are used for the correlation, the correlation can be aligned with the receipt of only one sync word. As such, the scanning window may be opened for a total of 25 μs to receive 25 bits of the sync word. With this embodiment, the operation of the radio receiver can be reduced down to 6 μs+25 μs=31 μs.

Reducing the duration of the scanning window from 70 μs to 31 μs by utilizing thirty-two parallel correlators represents a potential power savings of 54%. Reduced power consumption may be achieved by operating the radio receiver of the connectable device for 31 μs to receive 25 bits of the sync word and by using thirty-two parallel correlators to determine the probability of a positive correlation for the entire 32-bit sync word based on the correlation value of 25 bits in the sync word.

In an additional embodiment employing parallel correlators, sub-sampling the spacing of the parallel correlators can be used to implement a subset of sampling at particular intervals. In a particular embodiment, eight parallel correlators may be used to perform the correlation and each parallel correlator is set at a four sample interval of the 32-bit sync word. With each of the eight parallel correlators at a four sample interval, the duration of the scanning window can be reduced to 6 μs+25 μs+4 μs=35 μs. Reducing the duration of the scanning window from 70 μs to 35 μs represents a potential power savings of 50%. Reduced power consumption is achieved by operating the radio receiver of the connectable device for 35 μs to receive 25 bits of the sync word and by using eight parallel correlators set to four sample intervals to predict the probability of a positive correlation for the entire 32-bit sync word based on the correlation value of 25 bits in the sync word.

In an additional embodiment employing parallel correlators and sub-sampling, four parallel correlators set at an eight sample interval of the 32-bit sync word may be used to determine the correlation value. With each of the four parallel correlators at an eight sample interval, the duration of the scanning window can be reduced to 6 μs+25 μs+8 μs=39 μs. Reducing the duration of the scanning window from 70 μs to 39 μs represents a potential power savings of 45%. Reduced power consumption is achieved by operating the radio receiver of the connectable device for 35 μs to receive 25 bits of the sync word and by using four parallel correlators set to eight sample intervals to predict the probability of a positive correlation for the entire 32-bit sync word based on the correlation value of 25 bits in the sync word.

In an additional embodiment, the received portion of the sync word may be stored in a memory unit prior to performing the correlation with the expected sync word. By storing the received portion of the sync word into memory, a faster correlator can be used to perform the cross correlation with a portion of the expected sync word at every offset, without the need for parallel correlators, and the scanning window only needs to be open long enough to receive a total of 25 bits of one sync word. As such, the duration of the scanning window can be reduced to 6 μs+25 μs=31 μs. Reducing the duration of the scanning window from 70 μs to 31 μs represents a potential power savings of 56%. Reduced power consumption is achieved by operating the radio receiver of the connectable device for 31 μs to receive 25 bits of the sync word and by storing the portion of the sync word in a memory unit. The correlation is then performed in the background using a faster correlator to predict the probability of a positive correlation for the entire 32-bit sync word based on the correlation value of 25 bits in the sync word.

Using a memory unit, the scanning window can also be opened for 32 μs to receive the entire 32-bit sync word and the 32-bit sync word can be stored in the memory unit. Cross-correlation can then be performed at every offset for the 32-bit sync word stored in the memory unit. By storing the received sync word into memory, a faster correlator can be used to perform the cross correlation with the expected sync word at every offset without the need for parallel correlators, and the scanning window only needs to be open long enough to receive a total of 32 bits of one sync word. As such, the duration of the scanning window can be reduced to 6 μs+32 μs=38 μs. Reducing the duration of the scanning window from 70 μs to 38 μs represents a potential power savings of 46%. Reduced power consumption may be achieved by operating the radio receiver of the connectable device for 38 μs to receive the entire sync word and by storing the sync word in a memory unit. The correlation is then performed in the background using a faster correlator to predict the probability of a positive correlation using the stored 32 bits on one sync word.

In an additional embodiment, the energy level at the receiving frequencies of the sync word may be measured while the portion of the sync word is being received to determine whether or not a signal is present at any of these frequencies. If the detected energy level does not exceed an expected level, it can be determined that a signal is not present and the radio receiver can be powered down before the portion of the sync word has been received. If the detected energy level exceeds an expected level, the scanning window may stay open for the required duration to receive the portion of the sync word. In this embodiment, reduced power consumption is achieved by operating an energy detection unit of the connectable device to detect the energy level while the portion of the sync word is being received and by powering down the radio receiver if the energy level detected does not exceed an expected level.

Figure 4:
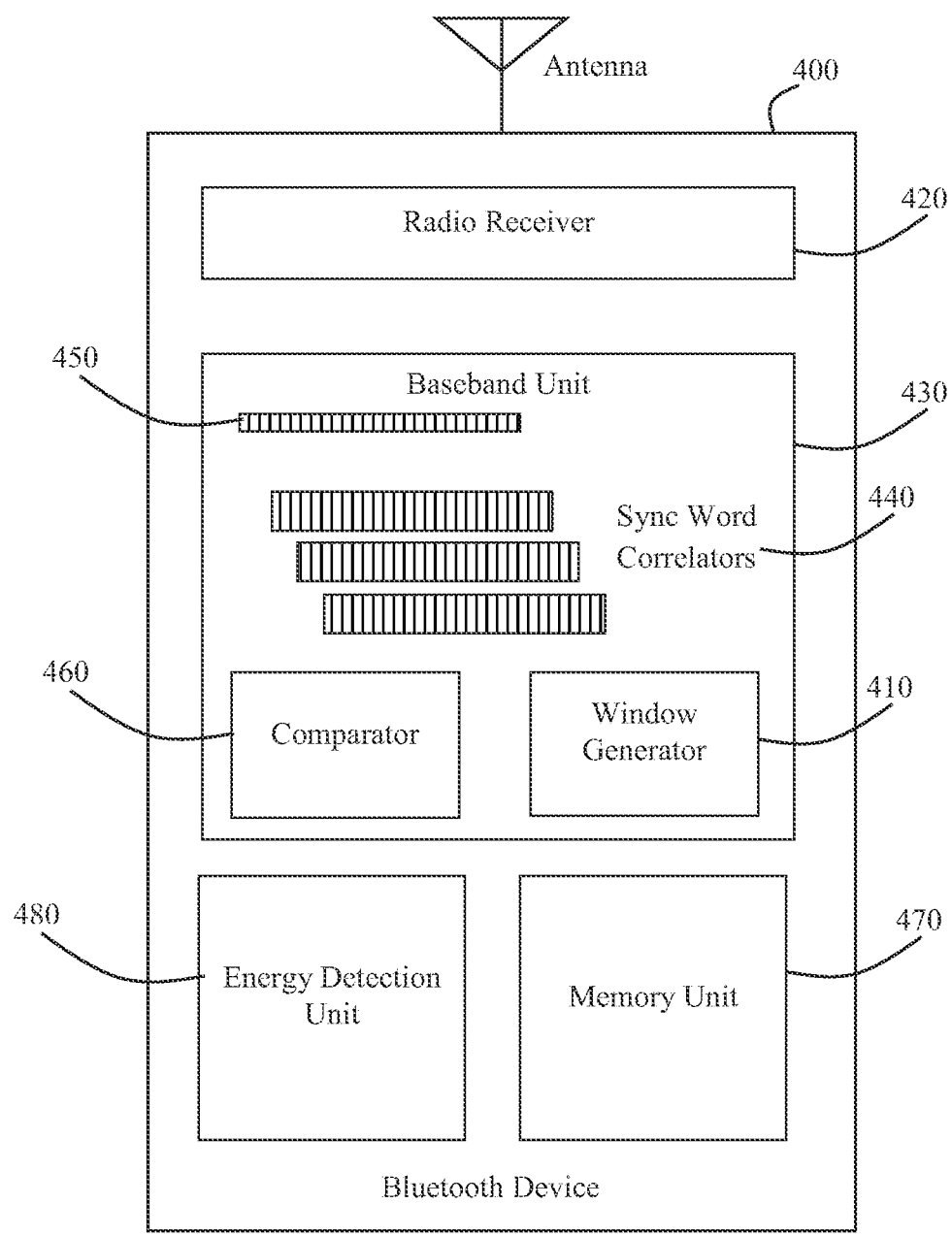
FIG. 4 is a diagram of a Bluetooth enabled device.

With reference to FIG. 4, a wireless Bluetooth enabled device 400 for predicting a positive correlation is illustrated. The baseband unit 430 of the Bluetooth enabled device 400 includes a window generator 410 to instruct a radio receiver 420 to power up and to receive a portion of a sync word. At least one correlator 440 of the baseband unit 430 determines a correlation value based on the received portion of the sync word and a portion of an expected sync word 450. A comparator 460 determines if the correlation value is less than a threshold value. If the correlation value is less than a threshold value, the comparator 460 may instructs the window generator 410 to power down the radio receiver 420. The Bluetooth enabled device 400 may further include a memory unit 470 to store the portion of the sync word prior to the determination of the correlation value against the expected sync word 450. The Bluetooth enabled device 400 may also include an energy detection unit 480 to detect an energy level while the portion of the sync word is being received. The energy detection unit 480 may instruct the window generator 410 to power down the radio receiver 420 if the detected energy level does not exceed an expected level, indicating that a signal does not exist.

The foregoing descriptions of specific embodiments of have been presented for purposes of illustration and description. They are not intended to be exhaustive or to limit the invention to the precise forms disclosed, and obviously many modifications and variations are possible in light of the above teaching. The embodiments were chosen and described in order to best explain the principles and practical applications, to thereby enable others skilled in the art to best utilize the various embodiments with various modifications as are suited to the particular use contemplated. It is intended that the scope be defined by the Claims appended hereto and their equivalents.

The invention claimed is:

1. A method for predicting a correlation, the method comprising:
   receiving, at a receiver, a portion of a sync word from a requesting device;
   determining a first correlation value based, at least in part, on the received portion of the sync word and a portion of an expected sync word, wherein the sync word is for correlating with the expected sync word;
   in response to determining that the first correlation value does not exceed a threshold value, powering down the receiver; and
   in response to determining that the first correlation value exceeds the threshold value, receiving an entire sync word from the requesting device, and
   determining a second correlation value based, at least in part, on the entire sync word and the expected sync word.

2. The method of claim 1, further comprising:
   powering up the receiver by opening a scanning window for a predetermined duration of time for receiving the portion of the sync word, wherein
      the predetermined duration of time is less than a duration of time used by the receiver to receive the entire sync word from the requesting device.

3. The method of claim 1, wherein determining the first correlation value comprises,
   correlating the received portion of the sync word against the portion of the expected sync word using a correlator having a size equal to a number of bits in the received portion of the sync word.

4. The method of claim 1, wherein determining the first correlation value comprises,
   correlating the received portion of the sync word against the portion of the expected sync word using a plurality of parallel correlators, each of the plurality of parallel correlators having a size equal to a number of bits in the received portion of the sync word.

5. The method of claim 1, wherein determining the first correlation value comprises,
   correlating the received portion of the sync word against the portion of the expected sync word using a number of parallel correlators, wherein
      the number of parallel correlators is equal to a first number of bits in the expected sync word, and
      each of the number of parallel correlators has a size equal to a second number of bits in the received portion of the sync word.

6. The method of claim 1, wherein determining the first correlation value comprises,
   correlating the received portion of the sync word against the portion of the expected sync word using a plurality of parallel correlators, wherein
      each of the plurality of parallel correlators is configured to correlate at a sample interval of the portion of the expected sync word, and
      each of the plurality of parallel correlators has a size equal to a number of bits in the received portion of the sync word.

7. The method of claim 1, further comprising:
   storing the received portion of the sync word in a memory unit, wherein
      determining the first correlation value is based, at least in part, on the received portion of the sync word stored in the memory unit.

8. The method of claim 1, further comprising:
   detecting an energy level of a signal including the portion of the sync word, wherein
      determining the first correlation value comprises correlating the received portion of the sync word against the portion of the expected sync word using a correlator when the detected energy level exceeds an energy threshold.

9. The method of claim 1, wherein
   the receiver is in a Bluetooth enabled device, and
   the requesting device is a Bluetooth enabled requesting device.

10. A device for predicting a correlation, the device comprising:
    a window generator configured to,
       instruct a receiver to receive a portion of a sync word;
    at least one correlator coupled to the window generator, the at least one correlator configured to,
       determine a first correlation value based, at least in part, on the received portion of the sync word and a portion of an expected sync word, wherein the sync word is for correlating with the expected sync word; and
    a comparator coupled to the at least one correlator and to the window generator, the comparator configured to:
       determine whether the first correlation value exceeds a threshold value, and
       instruct the window generator to power down the receiver in response to determining that the first correlation value does not exceed the threshold value;
    wherein the window generator is further configured to instruct the receiver to receive an entire sync word in response to determining that the first correlation value exceeds the threshold value; and
    wherein the at least one correlator is further configured to determine a second correlation value based, at least in part, on the entire sync word and the expected sync word.

11. The device of claim 10, wherein
    the window generator is further configured to instruct the receiver to power up and to receive the portion of the sync word by opening a scanning window for a predetermined duration of time, and
    the predetermined duration of time is less than a duration of time used to receive the entire sync word.

12. The device of claim 10, wherein the at least one correlator has a size equal to a number of bits in the received portion of the sync word.

13. The device of claim 10, wherein
    the at least one correlator comprises a plurality of parallel correlators, and each of the plurality of parallel correlators has a size equal to a number of bits in the received portion of the sync word.

14. The device of claim 10, further comprising a memory unit coupled to the at least one correlator, the memory unit configured to store the received portion of the sync word prior to the first correlation value being determined by the at least one correlator.

15. The device of claim 10, further comprising an energy detection unit coupled to the window generator, the energy detection unit configured to,
   detect an energy level of a signal including the portion of the sync word, wherein
      the at least one correlator is configured to determine the first correlation value when the detected energy level exceeds an energy threshold.

16. The device of claim 10, wherein the device is a Bluetooth enabled device.

17. A wireless device for predicting a correlation, the wireless device comprising:
   a receiver; and
   a baseband unit coupled to the receiver, the baseband unit configured to,
      open a scanning window for a predetermined duration of time to receive a portion of a sync word transmitted from a requesting device, wherein
         the predetermined duration of time is less than a duration of time used to receive an entire sync word,
      determine a first correlation value based, at least in part, on correlating the received portion of the sync word with a portion of an expected sync word, wherein the sync word is for correlating with the expected sync word,
      determine whether the first correlation value exceeds a threshold value,
      in response to determining that the first correlation value does not exceed a threshold value, power down the receiver, and in response to determining that the first correlation value exceeds the threshold value,
         receive the entire sync word from the requesting device, and
      determine a second correlation value based, at least in part, on correlating the entire sync word with the expected sync word.

18. The wireless device of claim 17, wherein the wireless device is a Bluetooth enabled connectable device.

19. A method for predicting a correlation, the method comprising:
   receiving, at a receiver, a portion of a sync word from a requesting device;
   determining a correlation value based, at least in part, on the received portion of the sync word and a portion of an expected sync word, wherein determining the correlation value comprises correlating the received portion of the sync word against the portion of the expected sync word using a plurality of parallel correlators, wherein
      each of the plurality of parallel correlators is configured to correlate at a sample interval of the portion of the expected sync word, and
      each of the plurality of parallel correlators has a size equal to a number of bits in the received portion of the sync word; and
   in response to determining that the correlation value is less than does not exceed a threshold value, powering down the receiver.

20. The method of claim 19, further comprising:
   powering up the receiver by opening a scanning window for a predetermined duration of time for receiving the portion of the sync word, wherein
      the predetermined duration of time is less than a duration of time used by the receiver to receive an entire sync word from the requesting device.

21. The method of claim 19, further comprising:
   detecting an energy level of a signal including the portion of the sync word, wherein
      determining the correlation value comprises correlating the received portion of the sync word against the portion of the expected sync word when the detected energy level exceeds an energy threshold.

22. The method of claim 19, wherein
   the receiver is in a Bluetooth enabled device, and
   the requesting device is a Bluetooth enabled requesting device.

* * * * *